United States Patent
Tuganbaev et al.

(10) Patent No.: US 8,472,719 B2
(45) Date of Patent: Jun. 25, 2013

(54) METHOD OF STRICKEN-OUT CHARACTER RECOGNITION IN HANDWRITTEN TEXT

(75) Inventors: Diar Tuganbaev, Moscow (RU); Dmitri Deriaguine, Moscow (RU)

(73) Assignee: ABBYY Software Ltd., Nicosia (CY)

( * ) Notice: Subject to any disclaimer, the term of this patent is extended or adjusted under 35 U.S.C. 154(b) by 1546 days.

(21) Appl. No.: 10/348,222

(22) Filed: Jan. 22, 2003

(65) Prior Publication Data

US 2004/0114803 A1    Jun. 17, 2004

(30) Foreign Application Priority Data

Dec. 17, 2002 (RU) .................... 2002133900

(51) Int. Cl.
*G06K 9/00* (2006.01)

(52) U.S. Cl.
USPC ........... 382/179; 382/135; 382/140; 382/176; 382/178

(58) Field of Classification Search
USPC ............... 382/119, 218, 101, 224, 309, 311, 382/310, 135–140, 176–189; 341/90
See application file for complete search history.

(56) References Cited

U.S. PATENT DOCUMENTS

| | | | | |
|---|---|---|---|---|
| 4,972,496 A * | 11/1990 | Sklarew | ........................ | 382/187 |
| 5,151,950 A * | 9/1992 | Hullender | ...................... | 382/187 |
| 5,481,278 A * | 1/1996 | Shigematsu et al. | .......... | 345/179 |
| 5,586,543 A * | 12/1996 | Schnaibel et al. | ............ | 123/696 |
| 5,680,479 A * | 10/1997 | Wang et al. | .................... | 382/176 |
| 5,796,866 A * | 8/1998 | Sakurai et al. | ................ | 382/187 |
| 5,923,793 A * | 7/1999 | Ikebata | ........................ | 382/311 |
| 5,933,526 A * | 8/1999 | Sklarew | ........................ | 382/189 |
| 6,219,449 B1 * | 4/2001 | Nagaishi | ...................... | 382/186 |
| 6,618,504 B1 * | 9/2003 | Yoshino | ........................ | 382/187 |

* cited by examiner

*Primary Examiner* — Wesley Tucker
(74) *Attorney, Agent, or Firm* — John C. Meline; LeighAnn Weiland

(57) ABSTRACT

A method of identifying stricken-out characters in handwriting, comprising parsing a scanned image into regions and objects, defining objects containing handwritten characters, applying structural or feature classifiers for primary character recognition, applying one or more supplemental feature classifiers preliminarily trained by strike-out characters, and identifying a stricken-out character if any. The stricken-out character may be further examined by special procedures, either automated or manual.

10 Claims, 2 Drawing Sheets

METHOD OF STRICKEN-OUT CHARACTER RECOGNITION IN HANDWRITTEN TEXT

BACKGROUND OF THE INVENTION

1. Field of the Invention

The present invention relates generally to optical character recognition and more particularly to recognition of handwritten characters from a bit-mapped image file.

2. Prior Art

According to traditional methods of text recognition, a bitmapped image from a scanned page is parsed into regions that presumably contain images of characters with further comparison of said images with models from one or more special feature classifiers.

Such a method is realized, for example, in U.S. Pat. No. 5,680,479 (filed on Oct. 21, 1997).

The main drawback of the traditional approach is that the result of recognition of a stricken-out character is commonly not an error statement, but a mistakenly recognized symbol as likely identified by contour. This causes recognition mistakes, since this mistakenly recognized character is not the one that has been stricken out. This stated drawback reduces greatly the application of known methods of text recognition. Known methods are not suitable for attainment of the stated technical result. Known methods do not indicate a presence of a stricken-out character, thus causing recognition errors.

SUMMARY OF THE INVENTION

The main technical result of the present invention is in handwritten characters recognition improvement, anti noise protection of the recognition process, and providing true identification of stricken out characters. The technical result is achieved by organizing an additional specialized feature classifier within the system containing features of a bulk variety of stricken out characters. In the case of high enough coincidence with the said classifiers element, the character is recognized as stricken-out and is directed for additional processing. The utilization of the proposed method can greatly increase the recognition quality of handwritten characters, and to make recognition more immune to noise.

DETAILED DESCRIPTION OF THE INVENTION

The proposed method in addition to the prior art comprises a special means for overcoming stricken-out character recognition errors. The said means comprises an additional feature classifier preliminarily trained by features of stricken-out characters.

The stricken-out character recognition process starts from primary applying structural or feature type classifiers to parsed images, presumably containing characters. In the case of a primary recognition failure, multiple results of recognition or recognition with not a high enough reliability level, a secondary attempt is performed along with one or more feature classifiers to recognize the character, narrow the list of possible characters versions or increase the reliability level of recognizing characters, respectively.

In the case of a primary or secondary recognition attempt success, one or more supplementary specialized classifiers are used, preliminarily trained by features of strike-out characters.

In the case of a close enough coincidence with the said additional classifiers model, the examined character is defined as stricken-out, and is subjected to additional processing. Said additional processing may be a manual procedure containing human intervention, or a fully automated method.

Figure 1:
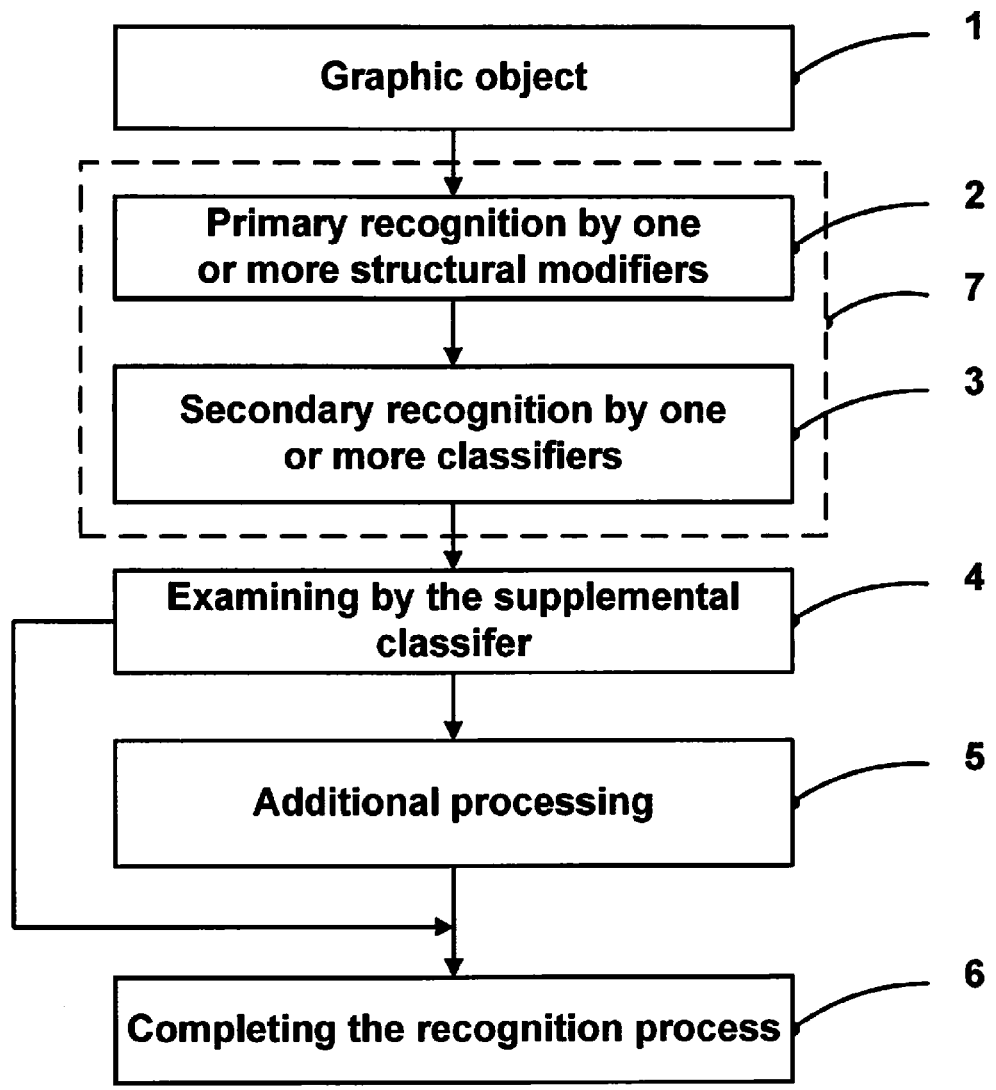
FIG. 1 is a block diagram showing the list of steps to be made when recognizing stricken-out handwritten characters according to the present invention.

The essence of the method is shown in FIG. 1.

Figure 2:
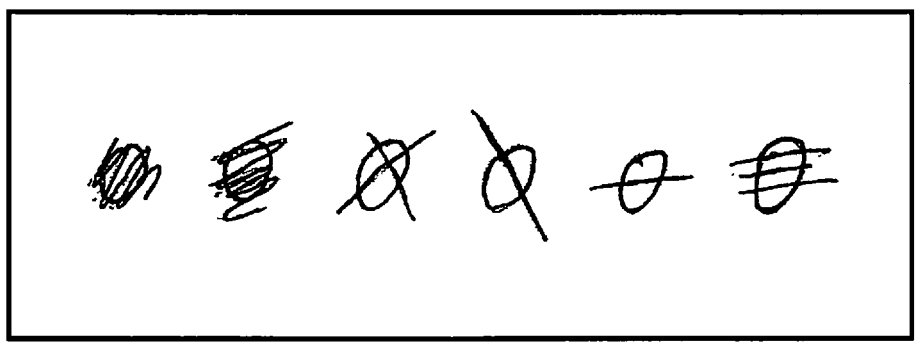
FIG. 2 shows examples of stricken out characters.
Figure 3:
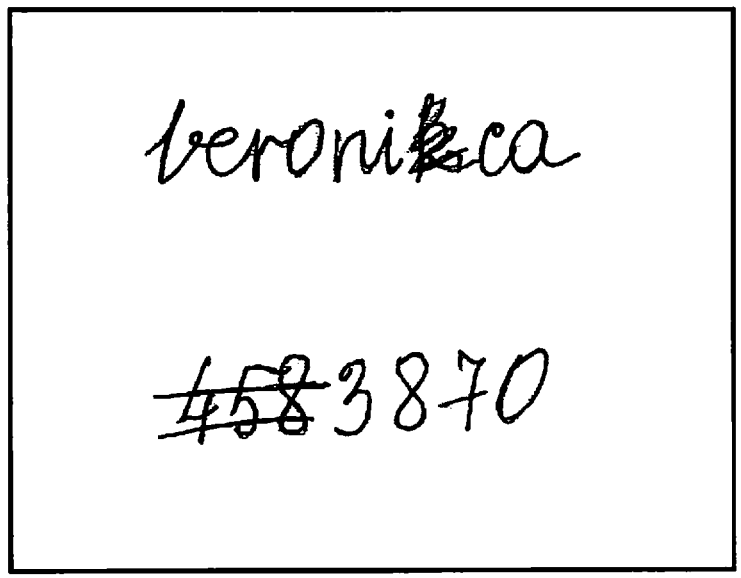
FIG. 3 shows additional examples of stricken out characters.

The matter of recognition includes a graphic object parsed from an initial document bit-mapped image that contains one or more stricken-out characters such as those shown in FIG. 2 and FIG. 3.

The said graphic object is subjected to one or more structural or feature type classifiers for primary recognition. This primary recognition in the present invention is the main character recognition means. As a result of the recognition process are one or more possible variants of characters along with corresponding reliability levels for each variant.

In case of a failure or multiple results from the primary recognition, a secondary recognition is then performed. A plurality of recognized variants of character are directed to one or more feature classifiers for the secondary recognition and for narrowing the possible characters (variants) list. The classifiers, used in the secondary recognition, use recognizing methods differently from those used by the primary classifiers, thus the concurrent use of different types of classifiers additionally increases the total recognition quality.

After examination by one or more secondary classifiers, the number of possible variants of characters decreases greatly, typically to only one, and their reliability increases.

After the character is examined in one or more specialized feature classifiers that are preliminarily trained by stricken-out characters. After the special classifier examination, a decision can be made whether to consider the character as stricken-out or assume the variant proposed by the primary or the secondary recognition. If the character is considered as stricken-out, it is directed then to additional processing. Said additional processing can be fully automated or can include human intervention.

The method comprises at least the following steps. The graphic object (1), presumably containing a stricken-out character, is directed for examination to one or more classifiers (7), assumed in the present invention as the primary recognition means. As a preferred embodiment of the present invention the primary recognition is performed by one or more structural classifiers (2). In a case of multiple results of primary recognition, the recognition results along with the graphic object (1) are sent for accurate definition to one or more classifiers (3) for secondary recognition, assumed in the present invention as the subsidiary recognition means. After the primary or the secondary recognition, the initial graphical object (1) along with the recognized version is examined in the supplemental specialized classifier (4) preliminarily trained by strike-out characters. In the case of high enough fitting by the additional classifier (4), the character is considered as stricken-out. After that it is directed to additional processing (5) with further completing the recognition process (6).

We claim:

1. A method for identifying stricken-out characters of handwritten characters, the method comprising:

parsing a scanned image of a document into objects;

selecting from them objects that presumably include handwritten characters;

applying by a processor of an electronic device one or more classifiers for primary character recognition to the selected objects;

selecting a most likely variant among a plurality of variants in a case of multiple recognition when applying the one or more classifiers for primary character recognition to the selected objects;

applying at least one supplemental feature classifier for stricken-out characters to at least one of the objects; and identifying a character as stricken-out where the features are better fitting when comparing stricken-out characters with at least one non-stricken-out character that is similar to the stricken-out characters.

2. The method for identifying stricken-out characters in handwriting as recited in claim 1, the method further comprising applying classifiers of structural type for primary character recognition to selected objects.

3. The method for identifying stricken-out characters in handwriting as recited in claim 1, further applying an additional processing to the character considered as stricken-out.

4. The method for identifying stricken-out characters in handwriting as recited in claim 3, where the additional processing further comprises detecting a human intervention.

5. A computer-implemented method for identifying stricken-out handwritten characters in a document including handwritten characters, the method comprising:

training a stricken-out feature classifier with examples of stricken-out handwritten characters, wherein the stricken-out feature classifier includes instructions operable by an electronic processor;

obtaining a copy of a document that includes at least one handwritten character;

parsing characters of the copy of said document;

identifying characters that are possibly handwritten characters by applying a first classifier to said parsed characters;

applying said stricken-out feature classifier to each possibly handwritten character; and identifying said handwritten character as stricken-out by said trained stricken-out feature classifier when a level of coincidence is sufficiently achieved for identifying a stricken-out character.

6. The method of claim 5 wherein method further comprises:

applying a second classifier to said parsed characters prior to applying said stricken-out feature classifier.

7. The method of claim 6 wherein the first classifier or the second classifier is a classifier of a structural type for character recognition.

8. The method of claim 5 wherein the method further comprises receiving a signal by a device in response to detecting a manual procedure.

9. One or more computer readable storage media encoded with instructions for performing a method, the instructions comprising:

parsing a scanned image of a document into objects;

selecting, from the parsed objects, objects that possibly include one or more handwritten characters;

applying one or more classifiers for character recognition to the selected objects that possibly include one or more handwritten characters;

selecting one or more most likely variants from among a plurality of variants when applying the one or more classifiers for character recognition to the selected objects that include one or more handwritten characters;

applying a stricken-out character classifier to at least one of the one or more most likely variants; and identifying a character as stricken-out where the features are better fitting when comparing stricken-out characters with at least one non-stricken-out character that is similar to the strikenout characters.

10. The one or more computer readable storage media of claim 9, the instructions further comprising applying an additional processing to the character identified as stricken-out.

* * * * *